Sept. 26, 1961   M. W. WOODS ET AL   3,001,283
PIPE CUTTING APPARATUS AND THE LIKE
Filed Feb. 13, 1961
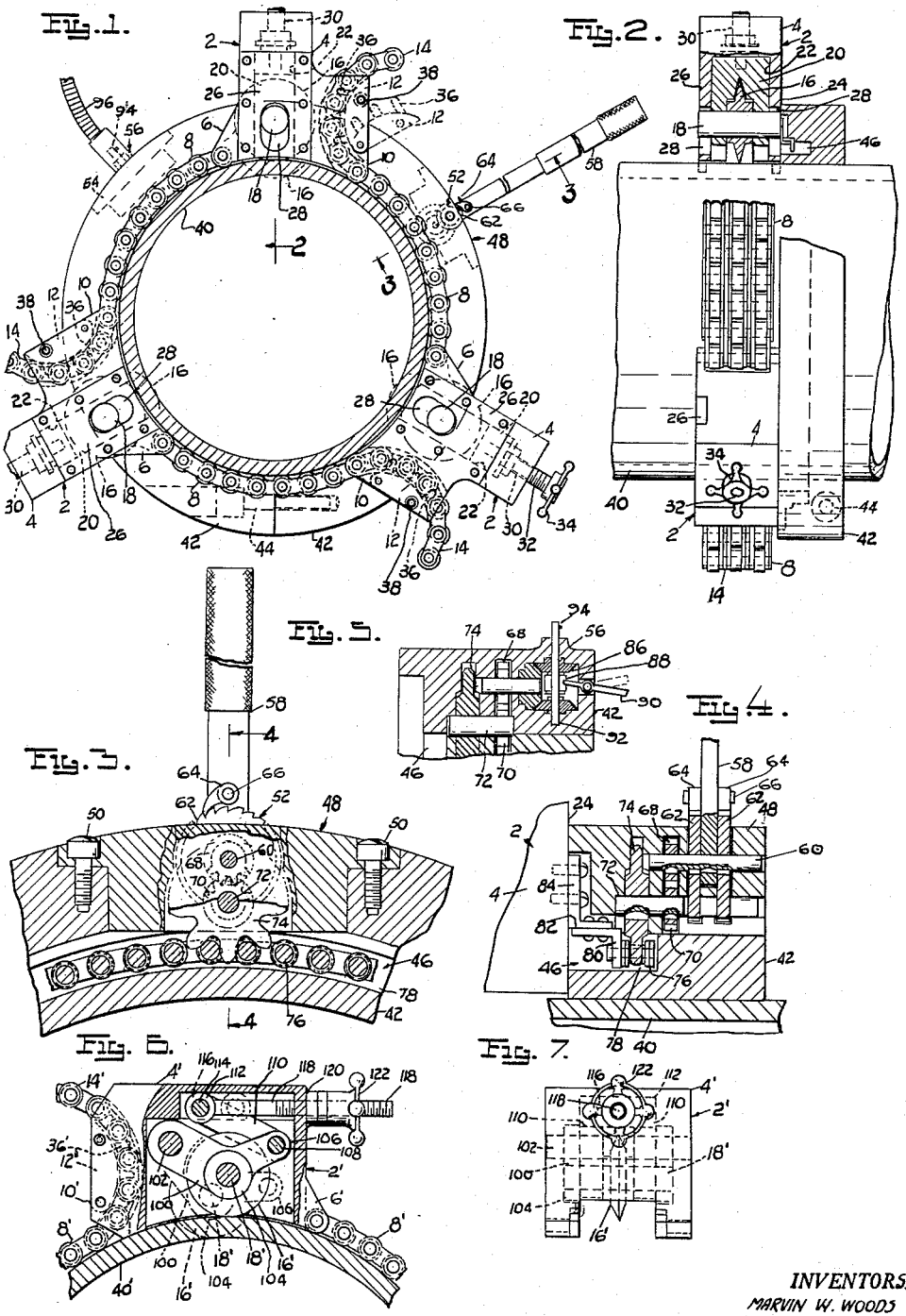
INVENTORS.
MARVIN W. WOODS
ADOLPH F. GRAF von SODEN
BY
ATTORNEY

United States Patent Office 3,001,283
Patented Sept. 26, 1961

3,001,283
PIPE CUTTING APPARATUS AND THE LIKE
Marvin W. Woods, 2117 Medford St., Escondido, Calif., and Adolph F. Graf von Soden, 4529 Noyes St., San Diego, Calif., assignors of twenty-five percent to Raymond A. Turner
Filed Feb. 13, 1961, Ser. No. 88,774
4 Claims. (Cl. 30—97)

This invention relates to pipe cutting apparatus and more particularly to devices adapted for cutting, trimming and for severing pipes and tubings of diversified sizes and materials, whereby considerable time may be saved when the apparatus is employed in close quarters and in inaccessible places.

Accordingly an object of the invention is to provide a pipe cutting apparatus consisting of suitable sections forming units or cutting heads, said cutting unit having means for locking one unit with the other, so that variable sizes of pipes may be cut when desired.

A further object of the invention is to provide each of said pipe cutting section or unit with a suitably arranged rolling knife or disc, which is adjustably mounted therein and for securing a constant pressure upon the pipe surface, when said pipe cutting apparatus is in use and operation.

Another object of the invention is to provide said pipe cutting apparatus with suitable driving means, adapted for attaching suitable drive shaft thereto and thereby facilitating the pipe cutting operation.

A further object of the invention is to provide said pipe cutting apparatus with suitable ratchet actuating means adapted for moving said cutting heads around the pipe wall and thereby facilitating the pipe cutting operation in close quarters, and also, said cutting head having means for progressively adjusting said rolling knife or disc and impressing same into the pipe wall, and when each cutting head comes to and overlaps the cut or impression made by an anterior rolling knife or disc, and when the apparatus is in use and operation.

Another object of the invention is to provide said cutting head or unit with a suitable clamping and locking means, so that when in use, one head or unit may be employed when cutting comparatively small pipe, and that several cutting heads may be attached and locked together for securing a pipe cutting apparatus having multiple and following cutting discs, therefore decreasing considerably the time required for cutting and that said apparatus may be used and employed for cutting large pipes and tubular vessels.

The invention also has for its objects to provide such means that are positive in operation, convenient in use, easily installed in a working position and easily disconnected therefrom, economical in manufacture, relatively simple, and of general superiority and serviceability.

The invention also comprises novel details of construction and novel combinations and arrangements of parts, which will more fully appear in the course of the following description.

Reference is now had to the accompanying drawings in which the similar reference characters denote the same parts.

In the drawings:

FIG. 1 shows a front elevational view of the pipe cutting unit in multiple form and attached together, and shown in position when in use over the pipe.

FIG. 2 shows a fragmentary sectional view thereof, taken on the line 2—2 of FIG. 1.

FIG. 3 shows a fragmentary sectional and an enlarged view of the ratchet feed apparatus, which is substantially a part of the pipe cutting unit, taken on the line 3—3 of the FIG. 1.

FIG. 4 shows a vertically sectional view of the ratchet feed drive apparatus, taken on the line 4—4 of the FIG. 3.

FIG. 5 shows a fragmentary sectional view of the cutter unit drive apparatus, applicable for a motor drive attachment in place of the ratchet drive.

FIG. 6 shows a fragmentary side sectional view of the cutter unit, showing same in a modified form.

FIG. 7 shows an end view of the cutter unit, taken from the right of FIG. 6.

Describing the invention more in detail, in its broader aspects, said invention comprises a cutter unit 2 which consists of a housing 4 having suitable bracket member 6 to which a section of a suitable roller chain 8 is attached, said chain extending outwardly therefrom and which is attached to a rear bracket 10 of said housing, having a hinged clamp 12 and adapted for holding the extended end 14 of said roller chain in place.

Said housing 4 is provided with a movable and adjustable pipe cutter, in form of a rolling knife or a disc 16, which is mounted upon a shaft 18 the ends of which extend sidewardly from said disc and are journaled within a knife block 20, as shown in FIG. 2.

Said knife block 20 is slidably mounted within a rectangular block retainer 22 of said housing 4, which lays against the rear wall section 24, while the front section of said housing is enclosed by means of a front plate member 26, which is held in place by means of screws, for allowing said knife block 20 to move and slide in a vertical position, carrying said rolling knife or disc 16 therewith, as shown in FIG. 1, and then, in order to prevent an undue sideward strain and bind of said knife block within said block retaining section 22, the ends of said shaft 18 extending outwardly are allowed to pass through suitable slots or shaft end guides 28, which are provided in said front end plate member 26 and said rear wall section 24, and thereby maintaining said roller knife or disc 16 in cutting position and during the operation of the apparatus.

The adjustable position of said slidably mounted knife block 20 is controlled by means of an adjusting screw 30, the inner end of which is suitably mounted in said block 20, so that a depression and retraction thereof may be maintained as required, which is also provided with an outwardly extending end section 32 having a suitable knob member 34 secured thereto, whereby a manual control of the roller knife or disc 16 may be had.

In assembly, when said roller chain end 14 is placed within the passage provided in said rear bracket 10, said hinged clamp 12 is then pressed into place, allowing the clamping prongs 36 to bear in between the rollers and spaces provided therein, thus holding said chain in position, whereupon the locking pin member 38 is inserted into a socket and for holding said clamp 12 in place and forming substantially a part of said housing 4.

It may be noted, that only one cutting unit 2 may be used when a small diameter pipe or tubing 40 is desired to be trimmed or cut, in which case, the roller chain end 14 is fastened and clamped into position at the rear bracket 10 by means of said hinged clamp member 12 of the cutting unit 2 which is desired to be used for cutting operation.

Also, that when it may be necessary to cut a pipe 40 which is large in diameter, then the several cutting units 2 may be employed, their respective roller chain ends 14 connecting the housings 4 in series, clamping the chain ends into place and thus forming a cutter unit in series, following each other and when cutting said large pipe or a cylindrical vessel.

In order to hold said cutting knives or discs 16 in line, said roller chain 8 is composed of a triple or a quadruple strand, which when in use and position, prevents the sideward deflection and allows said cutting discs 16 in the respective cutting units 2, to follow a single groove, so that a pipe wall penetration may be secured.

Further, to insure the position of said cutter units 2 when mounted over said pipe 40, a suitable split collar unit 42 is provided, having suitable screws or bolts 44 adapted for holding the collar halves or sections thereof in place and together, for forming a ring around said pipe 40, said split collar is mounted at one side and against said cutting units 2 and the adjacent side thereof is provided with a side-annular groove 46, as shown in FIGS. 2, 3, 4 and 5, the purpose of which will be presently described.

One half or part section of said split collar 42 is provided with a detachably mounted drive gear and control block 48, which is held in place by means of screws 50, as shown in FIG. 1, said control block 48 being provided with a hand control ratchet unit generally designated by numeral 52, while the power actuated block member 54 mounted in the adjacent collar section of said split collar 42 is provided with an alternate drive, wherein the motor driven control 56 is positioned.

Said hand control ratchet unit 52 comprises a handle bar 58 which is pivoted upon a pivot shaft 60 and having a pair of ratchet wheels 62 engaging pawls 64 which are pivotally connecting said handle bar 58 by means of a suitable cross pin 66.

The ratchet wheels 62 are oppositely mounted alongside said handle bar 58 and the respective pawls 64 are inversely positioned, so that only one ratchet wheel and said pawl may be engaged at one time, and thereby securing an opposite rotation of said ratchet wheels 62 during the oscillating motion of said handle bar 58.

The pivot shaft 60 is also provided with a suitable spur gear 68, which is held in place and in mesh with a companion spur gear 70 disposed below the former and which is mounted upon gear shaft 72, said gear shaft having also a suitable chain sprocket wheel 74 mounted thereon, as shown, which is held in an engaged position with a roller chain 76 disposed thereunder.

Said roller chain 76 rests within a chain groove 78 of said split collar 42 including said hand controlling ratchet unit 52 and said motor driven control unit 56 provided therein, and wherein said roller chain is slidably positioned, and, adjacently to said cutting unit 2, said roller chain is provided with a suitable angle bracket member 80, which is also attached to an angle plate 82 of which the longer leg section 84 is mounted upon the face of the rear wall 24 of said housing 4, as shown.

Since the split collar 42, in halves or sections thereof, are stationarily mounted upon the outer surface section of said pipe 40, and, by securing said roller chain 72 by means of said bracket member 80 and said angle plate 82 to each housing 4 of said cutting unit 2, then the oscillating motion of said handle bar 58 will cause said sprocket wheel 74 to turn, thus pulling said roller chain 76 in the direction desired, which will cause said cutting unit 2 to follow, and then, by adjusting said knob 34 in said housing 4, said knife block 20 together with said cutting disc 16 will move downwardly causing a penetration of the wall surface of said pipe 40 and thereby cutting said pipe or trimming the end thereof as desired.

As shown in FIG. 5, the cutting unit drive is substantially identical with the structure shown in FIGS. 3 and 4, with the exception that in place of the ratchet actuating component parts of the apparatus, as shown in FIG. 4, a bevel gear drive 86 is provided therein, said drive having a suitable clutch 88 and a clutch control 90 mounted therein, also, said drive 86 is provided with a drive shaft and a shaft extension 92 and 94 respectively, adapted for engaging a flexible drive shaft 96, as shown in FIG. 1, which is connected to a suitable driving motor member (not shown).

As shown in FIGS. 6 and 7, said cutting unit is shown in a modified form, wherein the housing 4' is provided with the front bracket 6' to which said roller chain 8' is connected, also, having the rear bracket 10' provided with a hinged clamp 12', which is adapted for holding the extended end 14' of said roller chain in place.

Within said housing 4' a chamber is provided, wherein a suitable lever 100 is held in place by means of a pin 102, said lever 100 having a bearing 104 wherein said shaft 18' is mounted and on which said cutting disc 16' is secured, said cutting disc is normally disposed over the pipe wall of said pipe 40', as shown.

Said bearing 104 is also provided with a yoke extension 106 having a cross pin 108 mounted therein and to which a pair of link rods 110 are connected, said link rods having a hub 112 provided with a pin 114 on which a cross boss member 116 is pivotally mounted.

Said cross boss 116 is provided with an adjusting screw 118 which extends horizontally therefrom and passing through a suitable guiding boss 120 disposed at the front of said housing 4', while the end of said adjusting screw 118 is provided with a controlling knob 122, as shown.

When in operation, said cutting unit 2 either one or a number of them are placed over the pipe 40, and the cutting disc 16 is retarded into the housing 4, allowing the roller chain ends 14 to be fastened into place and clamped into position by means of said hinged clamp 12 supported in its locked position by means of a locking pin 38, and then the adjusting knob 34, as shown in FIG. 1, or the knob 122 as shown in FIG. 6, is actuated for causing said cutting disc 16 or 16' respectively, to bear against the surface of the pipe.

By oscillating said handle bar 58, or by operating a drive motor (not shown) which actuates said flexible shaft atached to the motor driven control 56, said cutting unit 2 is moved around the periphery of the pipe, and then, by adjusting the position of said cutting disc 16 or 16' in FIG. 6, then the pressure imparted to said cutter will penetrate the wall of said pipe, and thereby cutting same or trimming the end thereof, as required.

While this invention is described with great particularity it will be clear that the same may be modified throughout a wide range. We, accordingly, do not propose that this invention be limited to the exact details of construction herein shown on the drawings and described in the specification, and that reservation of the rights in practice are retained, to the end that the necessary changes and modifications may be made therein, which may come within the scope of the appended claims.

We claim as our invention:

1. In a pipe cutting apparatus of the class described, the combination of, a plurality of pipe cutting units, a roller chain interconnecting and locking said cutting units around a pipe, a pipe cutting disc adjustably mounted in said pipe cutting units, means in said pipe cutting units for adjusting the position of said pipe cutting discs progressively into cutting position; a split collar secured around said pipe and disposed in an adjacent position to said plurality of cutting units, and means in said split collar for engaging and for forcing said cutting units around said pipe.

2. In a pipe cutting apparatus of the class described, as disclosed in claim 1, wherein hand actuating ratchet means are provided in said split collar for moving said cutting units in either direction and around said pipe.

3. In a pipe cutting apparatus of the class described, as disclosed in claim 1, wherein a motor drive means is provided in said split collar in conjunction with said hand actuating ratchet means, for moving said cutting units around said pipe.

4. In a pipe cutting apparatus of the class described, as disclosed in claim 1, wherein locking means are provided in said cutting units for locking the extended ends of said roller chain ends in position, means in said cutting units for locking same to said split collar, and means in said split collar for moving said cutting units forwardly and rearwardly around said pipe, susbtantially as described.

References Cited in the file of this patent

UNITED STATES PATENTS

| | | |
|---|---|---|
| 182,900 | Curran | Oct. 3, 1876 |
| 761,071 | Hanna | May 31, 1904 |
| 930,755 | Holland | Aug. 10, 1909 |
| 1,183,158 | Auble | May 16, 1916 |
| 2,212,564 | Hord | Aug. 27, 1940 |